(12) United States Patent
Kamikawa

(10) Patent No.: US 12,539,726 B2
(45) Date of Patent: Feb. 3, 2026

(54) LINEAR MOTION MECHANISM

(71) Applicant: Sony Group Corporation, Tokyo (JP)

(72) Inventor: Yasuhisa Kamikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/574,759

(22) PCT Filed: Feb. 17, 2022

(86) PCT No.: PCT/JP2022/006362
§ 371 (c)(1),
(2) Date: Dec. 28, 2023

(87) PCT Pub. No.: WO2023/281796
PCT Pub. Date: Jan. 12, 2023

(65) Prior Publication Data
US 2024/0294047 A1    Sep. 5, 2024

(30) Foreign Application Priority Data
Jul. 7, 2021 (JP) ................... 2021-112639

(51) Int. Cl.
*B25J 18/02* (2006.01)
*B60G 11/00* (2006.01)
(Continued)

(52) U.S. Cl.
CPC ........ *B60G 17/0157* (2013.01); *B25J 18/025* (2013.01); *B60G 11/00* (2013.01);
(Continued)

(58) Field of Classification Search
CPC ................... F16H 25/20; B25J 9/1035
(Continued)

(56) References Cited

U.S. PATENT DOCUMENTS 6,210,097 B1 * 4/2001 Kim ................. B25J 19/002
901/14
7,281,773 B2 * 10/2007 Sato ................. A47B 88/47
312/333
(Continued)

FOREIGN PATENT DOCUMENTS

DE    102008062391 A1 *  6/2010  ............ E05F 15/622
JP    H03-111196 A        5/1991
(Continued)

OTHER PUBLICATIONS

International Search Report and Written Opinion mailed on Apr. 5, 2022, received for PCT Application PCT/JP2022/006362, filed on Feb. 17, 2022, 8 pages including English Translation.

*Primary Examiner* — T. Scott Fix
(74) *Attorney, Agent, or Firm* — XSENSUS, LLP

(57) ABSTRACT

Provided is a linear motion mechanism having a further enhanced strength of a structure.
The linear motion mechanism including an intermediate link including a conversion mechanism that converts a rotational force from a motor into a driving force in a linear direction, the intermediate link extending in the linear direction, a first link that linearly moves toward a first side in the linear direction from an end of the intermediate link on the first side on the basis of the driving force in the linear direction, and a second link that linearly moves toward a second side opposite to the first side from an end of the intermediate link on the second side on the basis of the driving force in the linear direction, in which the first link and the second link linearly move symmetrically in the linear direction in conjunction with each other.

14 Claims, 12 Drawing Sheets

(51) Int. Cl.
*B60G 17/015* (2006.01)
*B60R 16/027* (2006.01)
*F16H 37/12* (2006.01)

(52) U.S. Cl.
CPC ......... *B60R 16/027* (2013.01); *F16H 37/124* (2013.01); *B60G 2202/44* (2013.01); *B60G 2500/30* (2013.01); *B60G 2800/162* (2013.01)

(58) Field of Classification Search
USPC ........................ 74/490.01, 490.04, 490.05
See application file for complete search history.

(56) References Cited

U.S. PATENT DOCUMENTS

| | | | |
|---|---|---|---|
| 9,763,840 B2 * | 9/2017 | Rigsby | A61G 7/0513 |
| 9,970,225 B2 * | 5/2018 | Wynder | E05D 15/165 |
| 11,168,770 B2 * | 11/2021 | Taylor | E05F 15/619 |
| 2009/0016814 A1 | 1/2009 | Cheng | |
| 2009/0026164 A1 * | 1/2009 | Fukaya | B65G 37/02 |
| | | | 212/319 |

FOREIGN PATENT DOCUMENTS

| | | |
|---|---|---|
| JP | H05118399 A | 5/1993 |
| JP | 2005161427 A | 6/2005 |
| JP | 2011-199121 A | 10/2011 |
| JP | 2018188013 A | 11/2018 |
| WO | 2017/098981 A1 | 6/2017 |

* cited by examiner

LINEAR MOTION MECHANISM

CROSS-REFERENCE TO RELATED APPLICATIONS

The present application is based on PCT filing PCT/JP2022/006362, filed Feb. 17, 2022, which claims priority from Japanese Patent Application No. 2021-112639, filed Jul. 7, 2021, the entire contents of each are incorporated in this application by reference.

TECHNICAL FIELD

The present disclosure relates to a linear motion mechanism.

BACKGROUND ART

In recent years, development of a robotics technology that mimics a human motion by an electromagnetic or mechanical action has been advanced.

For example, a linear motion mechanism that extends and contracts in one direction is known as a mechanism for operating a leg or an arm of a robot. The linear motion mechanism is required to have a long stroke, be compact and lightweight, and have sufficient strength.

Patent Document 1 below discloses a cylindrical coordinate type extension/contraction shaft actuation mechanism having a vertical shaft standing upright from a turning table and an extension/contraction shaft extending and contracting in a horizontal axis direction orthogonal to the vertical shaft. The extension/contraction shaft actuation mechanism disclosed in Patent Document 1 can perform an extension/contraction operation by extending and contracting the extension/contraction shaft arm from the extension/contraction shaft casing.

CITATION LIST

Patent Document

Patent Document 1: Japanese Patent Application Laid-Open No. 3-111196

SUMMARY OF THE INVENTION

Problems to be Solved by the Invention

However, the extension/contraction shaft actuation mechanism disclosed in Patent Document 1 described above has a structurally low strength of the bearing portion of the extension/contraction shaft arm. Therefore, it is difficult to apply the extension/contraction shaft actuation mechanism disclosed in Patent Document 1 described above to a use in which an impact load is generated, such as a leg of a robot, or a use in which a heavy object is lifted such as a crane.

Therefore, the present disclosure provide a novel and improved linear motion mechanism capable of further enhancing strength.

Solutions to Problems

According to the present disclosure, there is provided a linear motion mechanism including an intermediate link including a conversion mechanism that converts a rotational force from a motor into a driving force in a linear direction, the intermediate link extending in the linear direction, a first link that linearly moves toward a first side in the linear direction from an end of the intermediate link on the first side on the basis of the driving force in the linear direction, and a second link that linearly moves toward a second side opposite to the first side from an end of the intermediate link on the second side on the basis of the driving force in the linear direction, in which the first link and the second link linearly move symmetrically in the linear direction in conjunction with each other.

MODE FOR CARRYING OUT THE INVENTION

Figure 1:
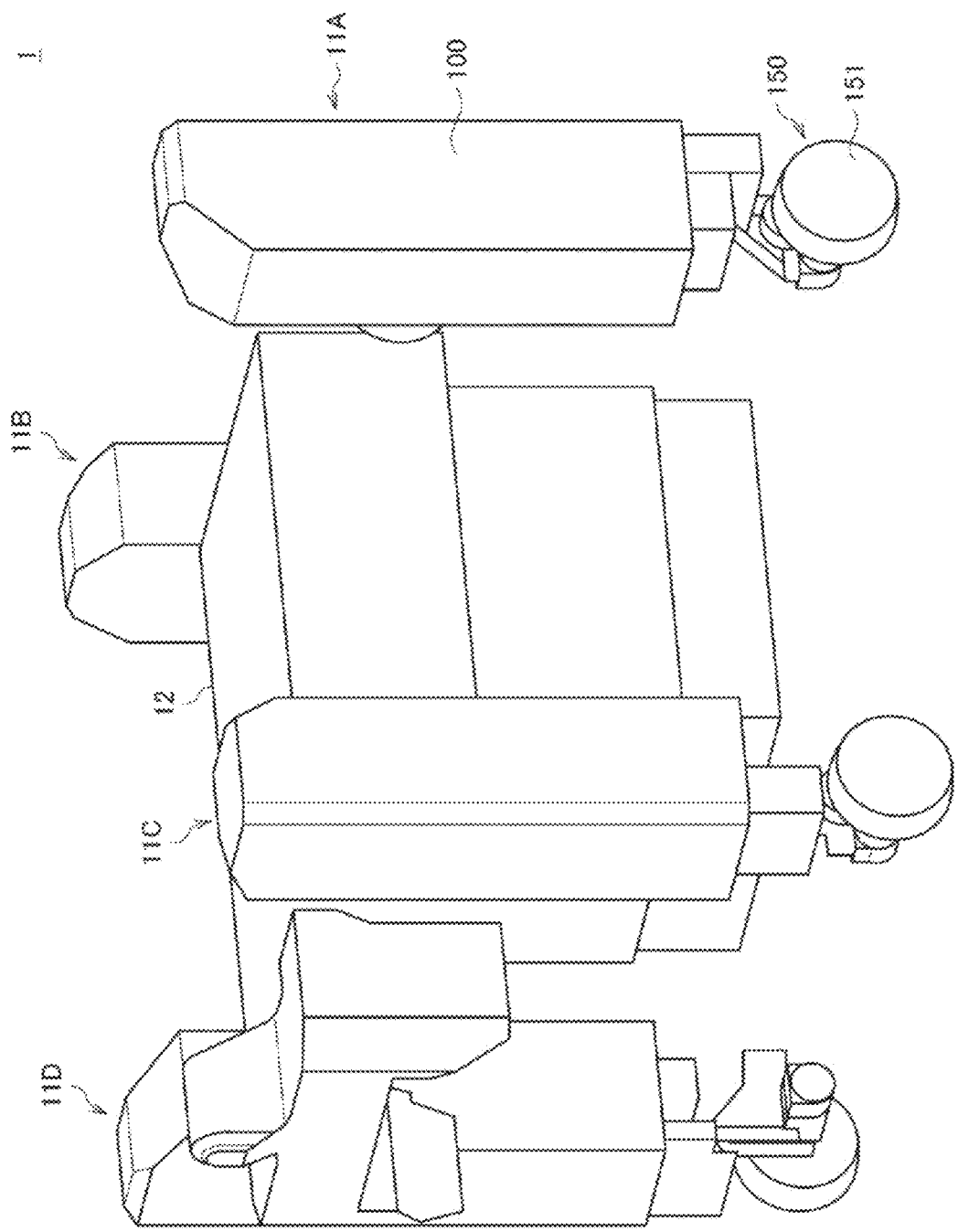
FIG. 1 is a schematic perspective view illustrating a configuration of a mobile object to which a technology according to the present disclosure is applied.

A preferred embodiment of the present disclosure is hereinafter described in detail with reference to the accompanying drawings. Note that, in this specification and the drawings, the components having substantially the same function configuration are assigned with the same reference sign and the description thereof is not repeated.

Note that the description will be given in the following order.

1. Configuration example
1.1. Configuration of mobile object
1.2. Configuration of linear motion mechanism
1.3. Configuration of intermediate link
2. Modifications
2.1. First modification
2.2. Second modification
2.3. Third modification
2.4. Fourth modification
3. Appendix

1. CONFIGURATION EXAMPLE (1.1. Configuration of Mobile Object)

First, a mobile object to which the technology according to the present disclosure is applied will be described with reference to FIG. 1. FIG. 1 is a schematic perspective view illustrating a configuration of a mobile object 1 to which the technology according to the present disclosure is applied.

As illustrated in FIG. 1, the mobile object 1 includes a main body 12 and a plurality of legs 11A, 11B, 11C, and 11D. The mobile object 1 is, for example, a legged robot device having four legs. However, the mobile object 1 may be a legged robot device having three legs or two legs, or may be a legged robot device having five or more legs. Hereinafter, the legs 11A, 11B, 11C, and 11D are not distinguished from each other and are collectively referred to as a leg 11.

The main body 12 corresponds to a body of the mobile object 1. The main body 12 is provided with, for example, a control device that controls the overall operation of the mobile object 1, various sensor devices that sense the external environment of the mobile object 1, a power supply device that supplies power to each unit of the mobile object 1, and the like.

The leg 11 is attached to the main body 12, supports the main body 12, and is used for walking of the mobile object 1. A linear motion mechanism 100 according to an embodiment of the present disclosure is included in at least one or more of the plurality of legs 11. For example, the leg 11 includes the linear motion mechanism 100 rotatably attached to the main body 12 and a ground contact portion 150 provided at an end of the linear motion mechanism 100.

The linear motion mechanism 100 is a mechanism that can extend and contract in the extending direction of the leg 11. The linear motion mechanism 100 is configured by coupling a plurality of links in series, and can extend and contract the leg 11 in the extending direction by sliding the plurality of coupled links with each other. The mobile object 1 can walk using the leg 11 by rotating and extending and contracting the linear motion mechanism 100 included in each leg 11.

The ground contact portion 150 includes a wheel 151. The wheel 151 is in contact with the traveling surface at the outer periphery, and is formed in a disk shape or a cylindrical shape rotatable about a rotation shaft parallel to the traveling surface. The wheel 151 is rotated by driving of the motor, so that the mobile object 1 can travel with the wheel without moving the leg 11.

The mobile object 1 having the above configuration can perform legged walking by alternately rotating and extending and contracting each of the legs 11 without driving the wheel 151 on a traveling surface having unevenness such as a stair or an unpaved road, for example. On the other hand, on a flat traveling surface such as a paved road, the mobile object 1 can perform wheel traveling by driving the wheels 151 while maintaining the posture of each leg 11.

In the mobile object 1 having the above configuration, the leg 11 can be extended and contracted by the linear motion mechanism 100. Therefore, the mobile object 1 having the above configuration can further reduce the height of the mobile object 1 when the leg 11 contracts. In addition, since the mobile object 1 having the above configuration can reduce the possibility of interference between the steps and the like and the legs 11 even in an uneven ground having a large step such as a stair, it is possible to more smoothly perform the legged walking.

(1.2. Configuration of Linear Motion Mechanism)

Figure 2:
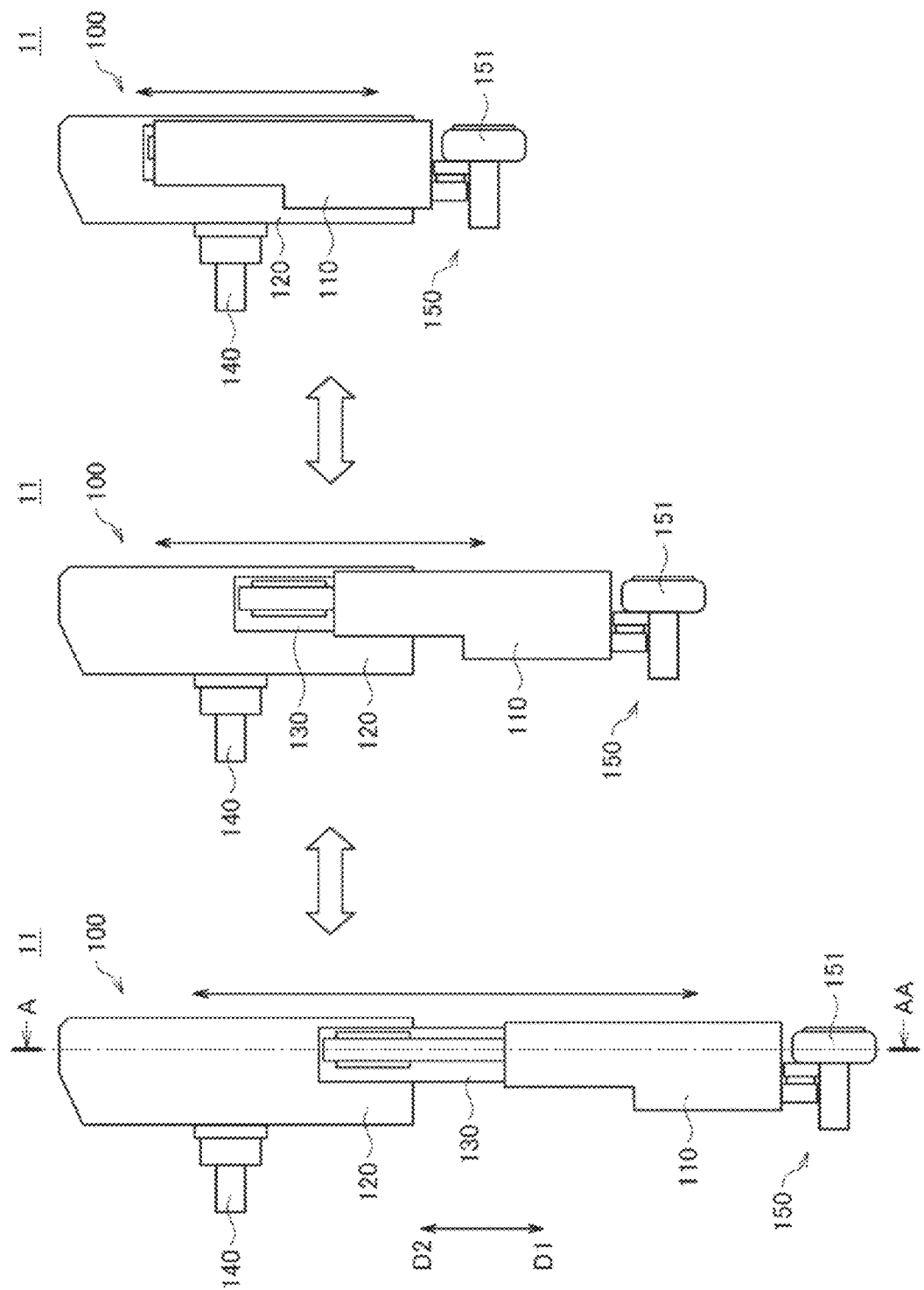
FIG. 2 is a cross-sectional view illustrating a configuration of a leg including a linear motion mechanism.
Figure 3:
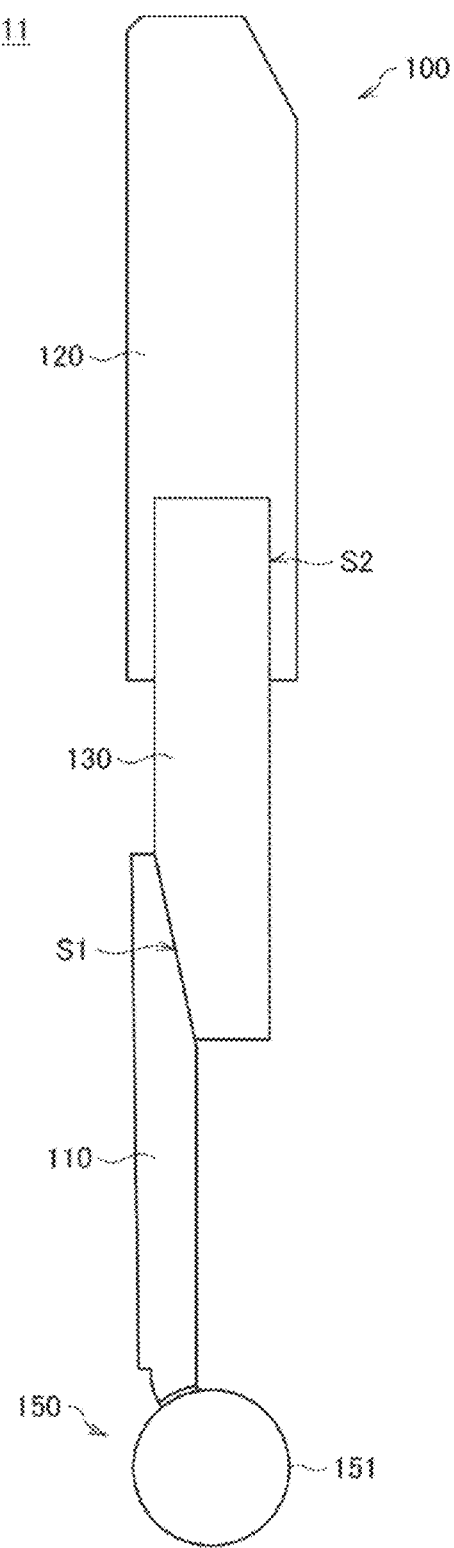
FIG. 3 is a cross-sectional view of a leg in FIG. 2 taken along line A-AA.

Next, a specific configuration of the linear motion mechanism 100 according to the present embodiment will be described with reference to FIGS. 2 and 3. FIG. 2 is a cross-sectional view illustrating a configuration of the leg 11 including the linear motion mechanism 100. FIG. 3 is a cross-sectional view of the leg 11 in FIG. 2 taken along line A-AA.

As illustrated in FIGS. 2 and 3, the linear motion mechanism 100 includes a first link 110, a second link 120, and an intermediate link 130. The ground contact portion 150 including the wheel 151 is as described above, and thus description thereof is omitted here.

The intermediate link 130 includes a conversion mechanism that converts the rotational force of the motor into a driving force in a linear direction, and is provided to extend in one direction. The linear motion mechanism 100 can extend and contract in multiple stages by extending and contracting the first link 110 and the second link 120 in directions opposite to each other on the basis of the driving force generated in the intermediate link 130. The linear motion mechanism 100 can reduce the number of transmission mechanisms of the driving force by extending and contracting the first link 110 and the second link 120 using the intermediate link 130 as a drive unit, so that the structure can be simplified and the weight can be reduced. A specific configuration of the intermediate link 130 will be described later.

The first link 110 is slidably coupled to the intermediate link 130. Specifically, the first link 110 includes the ground contact portion 150 including the wheel 151 at an end on the ground contact portion 150 side (first side D1), and is coupled to the intermediate link 130 at an end on the main body 12 side (second side D2). The first link 110 can slide along the intermediate link 130 toward the first side D1 on the basis of the driving force generated by the conversion mechanism included in the intermediate link 130.

The second link 120 is slidably coupled to the intermediate link 130 at an end opposite to the first link 110. Specifically, the second link 120 includes a joint portion 140 coupled to the main body 12 of the mobile object 1 at an end on the main body 12 side (second side D2), and is coupled to the intermediate link 130 at an end on the ground contact portion 150 side (first side D1). The second link 120 can slide along the intermediate link 130 toward the second side D2 on the basis of the driving force generated by the conversion mechanism included in the intermediate link 130.

The first link 110 may be coupled to the intermediate link 130 on a first face S1 facing the moving direction of the mobile object 1. In addition, the second link 120 may be coupled to the intermediate link 130 on a second face S2 that is opposite to the first face S1 with the intermediate link 130 interposed therebetween and is parallel to the first face S1.

Each of the first face S1 and the second face S2 is a faces whose normal direction is a moving direction orthogonal to the rotation shaft direction of the wheel 151 on the traveling surface in a case where, for example, the leg 11 is vertically erected on the traveling surface. Specifically, the first face S1 is a face facing the advancing direction side with respect to the moving direction of the mobile object 1, and the second face S2 side is a face facing the retreating direction with respect to the moving direction of the mobile object 1.

With this arrangement, the first link 110 and the second link 120 can receive a load applied from the moving direction at the time of walking of the mobile object 1 on the coupling face (the first face S1 and the second face S2)

between the first link 110 or the second link 120 and the intermediate link 130. Therefore, the linear motion mechanism 100 can further increase rigidity against a load applied when the mobile object 1 moves forward.

In addition, each of the first link 110 and the second link 120 may be provided in a box-shaped structure so that another link can be housed therein. Specifically, the first link 110 may be provided in a box-shaped structure capable of housing the intermediate link 130 therein, and the second link 120 may be provided in a box-shaped structure capable of housing the intermediate link 130 and the first link 110 therein. With this arrangement, at the time of contraction, the linear motion mechanism 100 is configured such that the first link 110 can house the intermediate link 130 and the second link 120 can house the first link 110 and the intermediate link 130, and thus can be downsized to a more compact size.

However, in order to prevent the first link 110 from interfering with the second link 120 at the time of contraction of the linear motion mechanism 100, the first link 110 may be provided in a box-shaped structure that is smaller than the box-shaped structure of the second link 120 and has a face partially opened. For example, the first link 110 may be provided in a box-shaped structure that is smaller than the box-shaped structure of the second link 120 and has an opening on the second face S2 side opposite to the first face S1 that is a coupling face with the intermediate link 130. With this arrangement, the first link 110 is provided in a box-shaped structure in which the face on the retreating direction side of the mobile object 1 is opened, so that it is possible to reduce the weight while maintaining the rigidity against the load applied when the mobile object 1 moves forward. Therefore, the linear motion mechanism 100 can further reduce the weight of the first link 110.

(1.3. Configuration of Intermediate Link)

Figure 4:
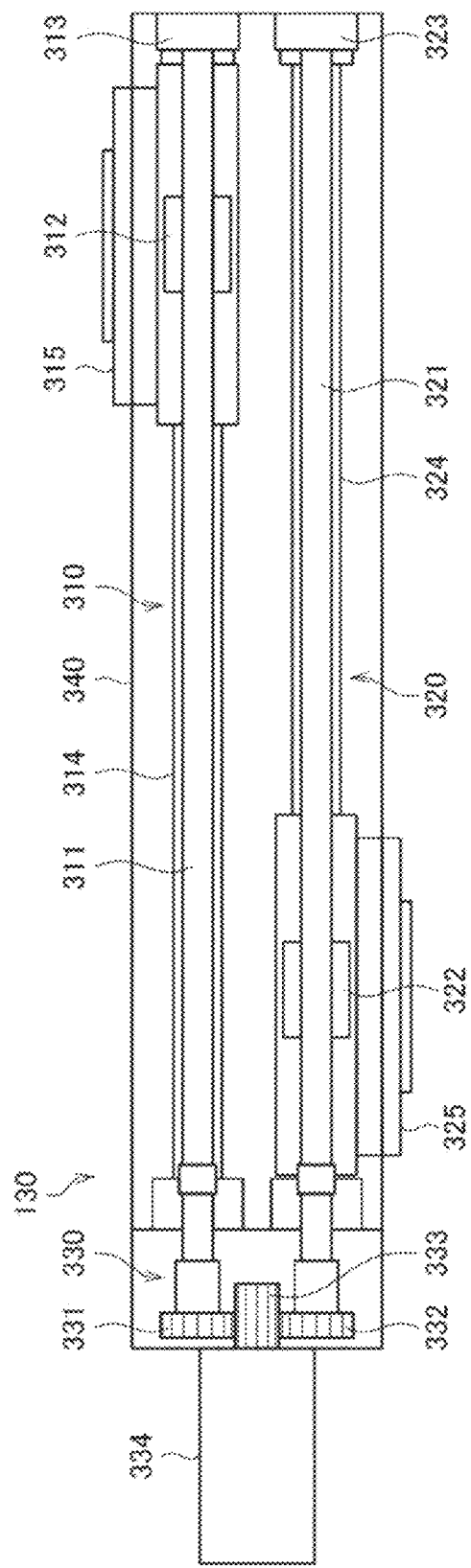
FIG. 4 is an explanatory diagram illustrating a specific configuration of an intermediate link.

Next, a specific configuration of the intermediate link 130 will be described with reference to FIG. 4. FIG. 4 is an explanatory diagram illustrating a specific configuration of the intermediate link 130.

As illustrated in FIG. 4, the intermediate link 130 includes a power unit 330, a first conversion mechanism 310, a second conversion mechanism 320, a housing 340, a first coupling unit 315, and a second coupling unit 325.

The first conversion mechanism 310 and the second conversion mechanism 320 are provided in parallel to each other, and convert the rotational force from the power unit 330 into a driving force in linear directions opposite to each other. With this arrangement, the first conversion mechanism 310 and the second conversion mechanism 320 can linearly move the first coupling unit 315 to which the first link 110 is coupled and the second coupling unit 325 to which the second link 120 is coupled in opposite directions. Therefore, the first conversion mechanism 310 and the second conversion mechanism 320 can extend and contract the first link 110 and the second link 120 in the linear direction along the intermediate link 130.

The power unit 330 includes a motor 334, a motor gear 333, a first gear 331, and a second gear 332.

The motor 334 is an electric motor that generates a rotational force by converting electric energy into mechanical energy. The motor 334 may include, for example, a rotor that rotates about an axis, a stator that generates a rotational moment by interacting with the rotor, a rotation shaft that transmits rotation of the rotor to the outside, and a bearing that supports the rotation shaft.

The motor gear 333 is a spur gear that rotates by the rotation of the motor 334. The motor gear 333 is connected to the rotation shaft of the motor 334 and meshes with the first gear 331 and the second gear 332. As a result, the motor gear 333 can transmit the rotational force generated by the motor 334 to the first gear 331 and the second gear 332.

The first gear 331 is a spur gear that meshes with the motor gear 333 and is connected to the first conversion mechanism 310. As a result, the first gear 331 can transmit the rotational force generated by the motor 334 to the first conversion mechanism 310 that converts the rotational force into the driving force in the linear direction.

The second gear 332 is a spur gear that meshes with the motor gear 333 and is connected to the second conversion mechanism 320. As a result, the second gear 332 can transmit the rotational force generated by the motor 334 to the second conversion mechanism 320 that converts the rotational force into the driving force in the linear direction.

In the power unit 330, by providing the motor gear 333 between the first gear 331 and the second gear 332, the rotational force of the motor 334 can be transmitted to the first conversion mechanism 310 and the second conversion mechanism 320 in a shorter distance. With this arrangement, since the motor gear 333, the first gear 331, and the second gear 332 can reduce the diameter and linear speed of the gears, it is possible to efficiently transmit the high-speed rotational force from the motor 334 to the first conversion mechanism 310 and the second conversion mechanism 320. Therefore, since the power unit 330 can transmit the rotational force from the motor 334 to the first conversion mechanism 310 and the second conversion mechanism 320 with a simpler mechanism, the reliability of the linear motion mechanism 100 can be improved.

The first conversion mechanism 310 includes a first threaded shaft 311, a first linear guide 314, a first bearing 313, and a first linear motion portion 312. With these configurations, the first conversion mechanism 310 may include, for example, a ball screw that converts a rotational force into a driving force in a linear direction.

The first threaded shaft 311 is a threaded shaft that is coupled to the first gear 331 and rotates on the basis of the rotational force from the motor gear 333. The first bearing 313 is provided at an end, of the first threaded shaft 311, opposite to an end where the first gear 331 is provided, and supports the first threaded shaft 311. The first linear motion portion 312 is a nut attached to the first threaded shaft 311 via a ball, and linearly moves in the axial direction of the first threaded shaft 311 as the first threaded shaft 311 rotates. With this arrangement, the first conversion mechanism 310 can convert the rotational force from the motor gear 333 into the linear motion in the axial direction of the first threaded shaft 311 by the first linear motion portion 312.

The first linear guide 314 includes a rail parallel to the axial direction of the first threaded shaft 311, and a slide portion that smoothly moves linearly on the rail in conjunction with the linear movement of the first linear motion portion 312. The first coupling unit 315 provided on the surface of the housing 340 of the intermediate link 130 is coupled to the slide portion of the first linear guide 314. With this arrangement, the first linear guide 314 can slide the first coupling unit 315 to which the first link 110 is coupled along the intermediate link 130 along with the linear movement of the slide portion. Therefore, the first conversion mechanism 310 can slide the first link 110 along the intermediate link 130 on the basis of the rotational force from the motor 334.

As in the first conversion mechanism 310, the second conversion mechanism 320 includes a second threaded shaft 321, a second linear guide 324, a second bearing 323, and a second linear motion portion 322. With these configurations, the second conversion mechanism 320 may include, for example, a ball screw that converts a rotational force into a driving force in a linear direction.

The second threaded shaft 321 is a threaded shaft that is coupled to the second gear 332 and rotates on the basis of the rotational force from the motor gear 333. However, the second threaded shaft 321 may be provided so as to be parallel to the first threaded shaft 311 and have a thread cutting direction opposite to that of the first threaded shaft 311. The second bearing 323 is provided at an end, of the second threaded shaft 321, opposite to an end where the second gear 332 is provided, and supports the second threaded shaft 321. The second linear motion portion 322 is a nut attached to the second threaded shaft 321 via a ball, and linearly moves in the axial direction of the second threaded shaft 321 as the second threaded shaft 321 rotates. With this arrangement, the second conversion mechanism 320 can convert the rotational force from the motor gear 333 into the linear motion in the axial direction of the second threaded shaft 321 by the second linear motion portion 322.

Here, the first threaded shaft 311 and the second threaded shaft 321 are provided such that thread-cutting directions thereof are opposite to each other. Therefore, in the first conversion mechanism 310 and the second conversion mechanism 320, since the rotational force from the motor gear 333 is converted into the driving forces in the opposite directions, the first linear motion portion 312 and the second linear motion portion 322 can linearly move in the opposite directions by the same rotational force from the motor gear 333. Therefore, the linear motion mechanism 100 can cause the intermediate link 130, the first link 110, and the second link 120 to perform two-stage extension and contraction operations with one motor 334.

The second linear guide 324 includes a rail parallel to the axial direction of the second threaded shaft 321, and a slide portion that smoothly moves linearly on the rail in conjunction with the linear movement of the second linear motion portion 322. The second coupling unit 325 provided on the surface of the housing 340 of the intermediate link 130 is coupled to the slide portion of the second linear guide 324. With this arrangement, the second linear guide 324 can slide the second coupling unit 325 to which the second link 120 is coupled along the intermediate link 130 along with the linear movement of the slide portion. Therefore, the second conversion mechanism 320 can slide the second link 120 along the intermediate link 130 on the basis of the rotational force from the motor 334.

The housing 340 houses the power unit 330, the first conversion mechanism 310, and the second conversion mechanism 320. A gap between the housing 340, and the first coupling unit 315 and the second coupling unit 325 is sealed by a seal unit.

The seal unit includes a strip seal that covers a gap provided in the housing 340 in order to linearly move the first coupling unit 315 and the second coupling unit 325, and a magnet seal that seals the inside of the housing 340 by attracting the strip seal to the housing 340. The first coupling unit 315 and the second coupling unit 325 linearly move while partially peeling off the strip seal attracted by the magnet seal, so that it is possible to linearly move while minimizing the gap generated between the housing 340, and the first coupling unit 315 and the second coupling unit 325. Therefore, since the intermediate link 130 can suppress entry of dust into the housing 340, it is possible to further reduce the possibility that a defect occurs in the first conversion mechanism 310 and the second conversion mechanism 320 due to dust.

In the intermediate link 130 having the above configuration, the rotational force from the motor 334 is transmitted to the first threaded shaft 311 and the second threaded shaft 321 via the motor gear 333, the first gear 331, and the second gear 332. Since the thread cutting directions of the first threaded shaft 311 and the second threaded shaft 321 are opposite to each other, the first linear motion portion 312 and the second linear motion portion 322 linearly move in opposite directions with the rotation of the first threaded shaft 311 and the second threaded shaft 321. As a result, the first link 110 and the second link 120 coupled to the first linear motion portion 312 and the second linear motion portion 322 can slide along the intermediate link 130 in conjunction with each other in opposite directions. According to the above operation, the linear motion mechanism 100 can linearly move the first link 110 and the second link 120 in conjunction with each other with respect to the intermediate link 130.

Note that, in the above description, the first conversion mechanism 310 and the second conversion mechanism 320 include a ball screw, but the technology according to the present disclosure is not limited to the above example. The first conversion mechanism 310 and the second conversion mechanism 320 may include a sliding screw instead of the ball screw.

2. MODIFICATION

Next, first to fifth modifications of the leg 11 including the linear motion mechanism 100 according to the present embodiment will be described with reference to FIGS. 5 to 12.

(2.1. First Modification)

Figure 5:
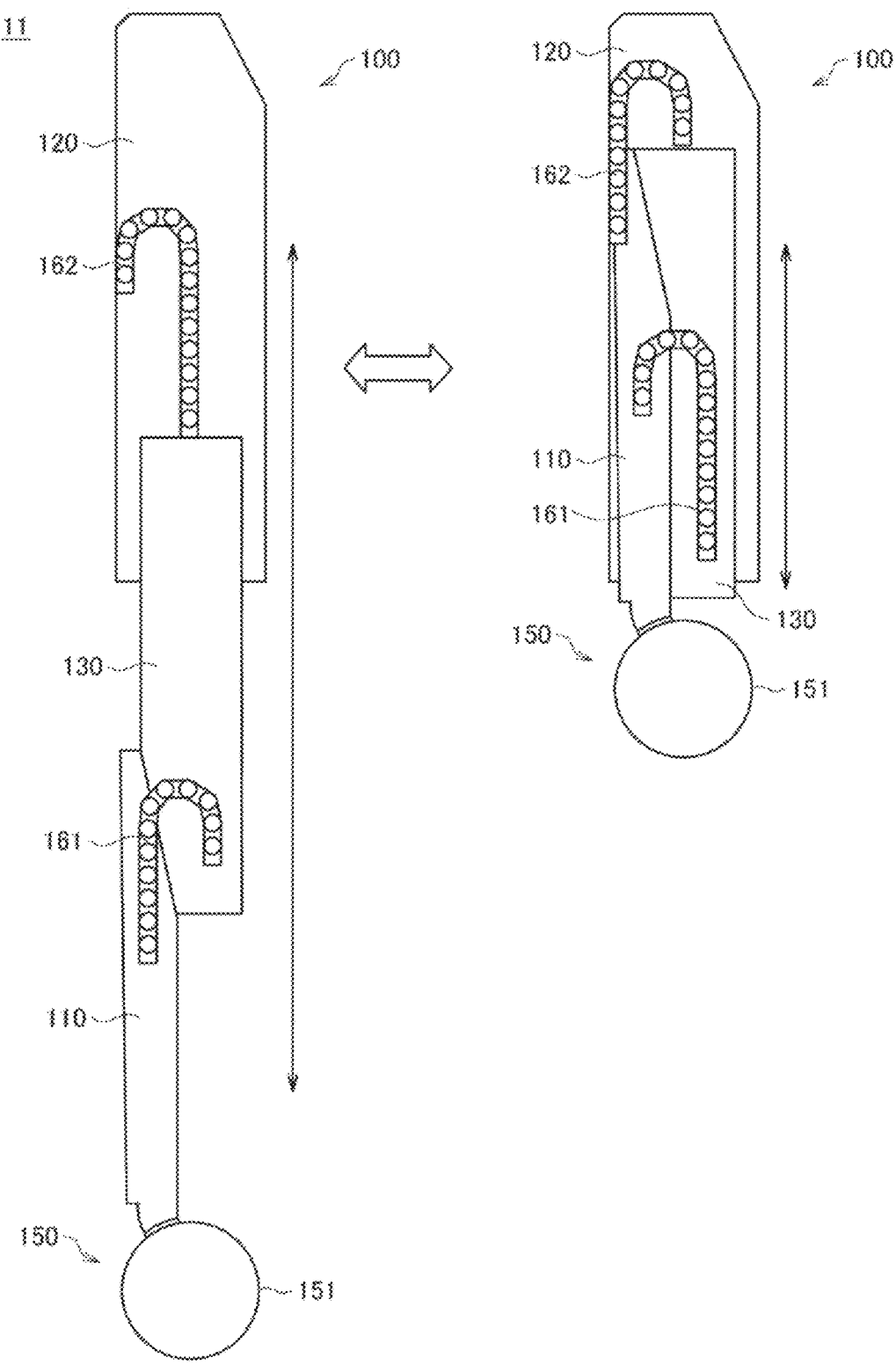
FIG. 5 is a cross-sectional view illustrating a configuration of a leg according to a first modification.

FIG. 5 is a cross-sectional view illustrating a configuration of the leg 11 according to a first modification.

As illustrated in FIG. 5, the leg 11 according to the first modification may further include a first cable carrier 161 and a second cable carrier 162.

The first cable carrier 161 and the second cable carrier 162 are structural members that can be deformed into an any curved structure while maintaining a rigid structure by continuously coupling a plurality of links capable of supporting wiring at a fine pitch.

In the leg 11, wiring is provided between the first link 110, the intermediate link 130, and the second link 120 in order to supply power from the main body 12 to the wheel 151 provided at the distal end of the first link 110 and to transmit a control command. However, the wiring provided between the first link 110, the intermediate link 130, and the second link 120 moves along with the extension and contraction of the linear motion mechanism 100, and thus may be entangled or damaged in other configurations. Therefore, in the leg 11 according to the first modification, the wiring provided between the first link 110, the intermediate link 130, and the second link 120 is supported by the first cable carrier 161 and the second cable carrier 162, so that the wiring can be protected.

For example, the first cable carrier 161 may support wiring that electrically connects the intermediate link 130 and the first link 110. In addition, the second cable carrier 162 may support wiring that electrically connects the intermediate link 130 and the second link 120. With this arrangement, the first cable carrier 161 and the second cable carrier 162 can be deformed into an any curved structure on a plane perpendicular to the rotation shaft of the wheel 151 while maintaining a rigid structure. Therefore, since the first cable carrier 161 and the second cable carrier 162 can prevent the wiring provided between the first link 110, the intermediate link 130, and the second link 120 from unintentionally moving, they can protect the wiring.

In addition, since the first cable carrier 161 and the second cable carrier 162 are deformed in a limited range on a plane perpendicular to the rotation shaft, they can be compactly housed inside the second link 120 of the wheel 151 when the leg 11 contracts. Therefore, the leg 11 according to the first modification can compactly house the wiring provided between the first link 110, the intermediate link 130, and the second link 120 when the leg 11 contracts.

(2.2. Second Modification)

Figure 6:
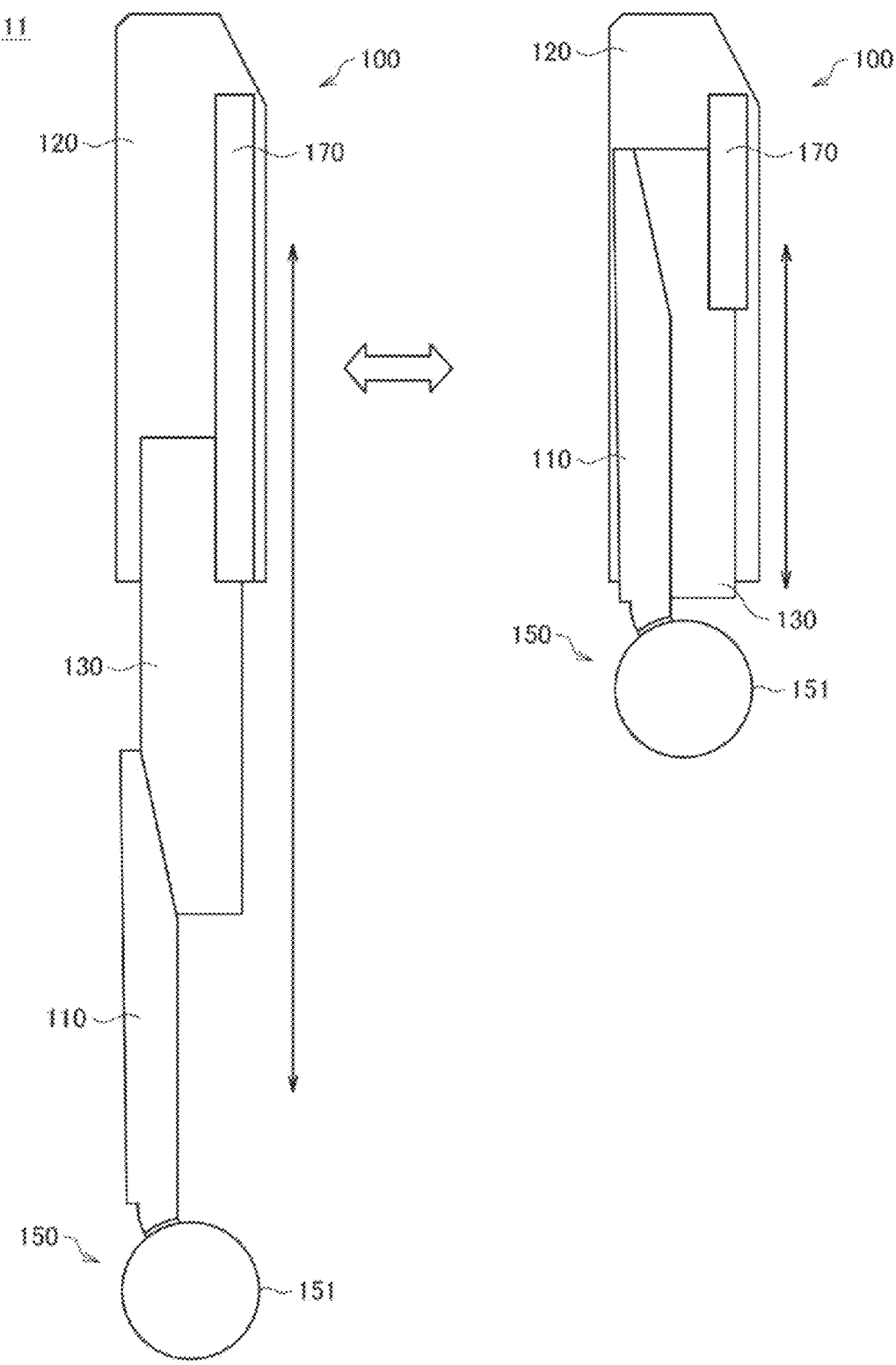
FIG. 6 is a cross-sectional view illustrating a configuration of a leg according to a second modification.

FIG. 6 is a cross-sectional view illustrating a configuration of the leg 11 according to a second modification.

As illustrated in FIG. 6, the leg 11 according to the second modification may further include an elastic unit 170 between the intermediate link 130 and the second link 120.

The elastic unit 170 includes, for example, an elastic member such as a spring, and causes an elastic force to act between the intermediate link 130 and the second link 120. Specifically, the elastic unit 170 includes a spring and a spring holder provided on the intermediate link 130 and a spring bearing structure provided on the second link 120. The elastic unit 170 can elastically deform the spring by receiving the spring with the spring bearing structure and compressing the spring between the intermediate link 130 and the second link when the leg 11 contracts.

With this arrangement, the elastic unit 170 can assist the extension of the linear motion mechanism 100 using the repulsive force of the spring at the time of extension of the leg 11 after contraction. In addition, since the elastic unit 170 is provided so that the spring is elastically deformed only when the leg 11 contracts, it is possible to sufficiently assist the extension of the linear motion mechanism 100 even with a spring that is short with respect to the entire length of the linear motion mechanism 100.

Furthermore, the leg 11 according to the second modification may further include the first cable carrier 161 and the second cable carrier 162 described in the leg 11 according to the first modification. In such a case, the elastic unit 170 may be disposed in parallel with the first cable carrier 161 and the second cable carrier 162 on a plane perpendicular to the rotation shaft of the wheel 151. With this arrangement, the first cable carrier 161, the second cable carrier 162, and the elastic unit 170 can be disposed inside the linear motion mechanism 100 without interfering with each other. Therefore, since the leg 11 can dispose the elastic unit 170, the first cable carrier 161, and the second cable carrier 162 inside the linear motion mechanism 100 without interfering with each other, it is possible to more efficiently utilize the internal space of the linear motion mechanism 100.

(2.3. Third Modification)

Figure 7:
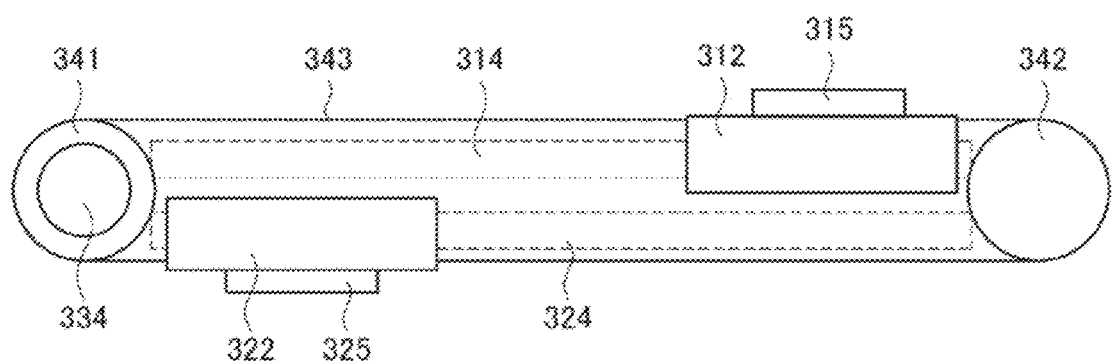
FIG. 7 is a schematic view illustrating a configuration of an intermediate link of a leg according to a third modification.

FIG. 7 is a schematic diagram illustrating a configuration of an intermediate link 130 of the leg 11 according to a third modification.

As illustrated in FIG. 7, the intermediate link 130 of the leg 11 according to the third modification may linearly move the first linear motion portion 312 and the second linear motion portion 322 in opposite directions using a chain 343 bridged between a pair of sprockets 341, and 342.

Specifically, the intermediate link 130 may include the motor 334, the pair of sprockets 341, and 342, the chain 343, the first linear guide 314, the second linear guide 324, the first linear motion portion 312, and the second linear motion portion 322 instead of the power unit 330, the first conversion mechanism 310, and the second conversion mechanism 320.

The pair of sprockets 341, and 342 is a mechanical element such as a gear that transmits rotation of the shaft to the chain 343. The chain 343 is bridged between the pair of sprockets 341, and 342 with tension to transmit rotation of the sprockets 341 to the first linear motion portion 312 and the second linear motion portion 322 as a driving force in a linear direction. The chain 343 may be a roller chain, a block chain, or the like, or may be a wire, a timing belt, or the like. The motor 334 is, for example, a power source that rotates the sprocket 341, and can reciprocate the chain 343 bridged between the pair of sprockets 341, and 342.

The first linear motion portion 312 is coupled to a predetermined portion of the chain 343, and linearly moves along the first linear guide 314 on the basis of the driving force by the reciprocating motion of the chain 343. The first linear guide 314 includes a rail parallel to the array direction of the pair of sprockets 341, and 342 and a slide portion smoothly movable on the rail, and smoothly linearly moves the first linear motion portion 312 connected to the slide portion along the rail.

The second linear motion portion 322 is coupled to a predetermined portion of the chain 343, and linearly moves along the second linear guide 324 on the basis of the driving force by the reciprocating motion of the chain 343. The second linear guide 324 includes a rail parallel to the array direction of the pair of sprockets 341, and 342 and a slide portion smoothly movable on the rail, and smoothly linearly moves the second linear motion portion 322 connected to the slide portion along the rail.

Therefore, the intermediate link 130 can linearly move the first linear motion portion 312 and the second linear motion portion 322 coupled to the chain 343 in the array direction of the pair of sprockets 341, and 342 by rotating the motor 334 to reciprocate the chain 343.

The first linear motion portion 312 and the second linear motion portion 322 may be provided, for example, on opposite sides to each other with the pair of sprockets 341, and 342 interposed therebetween. For example, in a case where the first linear motion portion 312 is disposed near one sprocket 342, the second linear motion portion 322 may be disposed near the other sprocket 341 with the pair of sprockets 341, and 342 interposed therebetween so as to be diagonal to the first linear motion portion 312. With this arrangement, the first linear motion portion 312 and the second linear motion portion 322 linearly move in opposite directions by the reciprocating motion of the chain 343. Therefore, the first link 110 and the second link 120 coupled to the first linear motion portion 312 and the second linear motion portion 322 can slide along the intermediate link 130 in conjunction with each other in opposite directions.

According to the intermediate link 130 according to the third modification, even in a case where a sprocket and a chain are used instead of a ball screw or a sliding screw, it is possible to slide the first link 110 and the second link 120 in conjunction with each other in opposite directions along the intermediate link 130. In the intermediate link 130 according to the third modification, the linear motion mechanism 100 can be configured at a lower cost by using a sprocket and a chain that are lighter and less expensive than a ball screw or a sliding screw.

(2.4. Fourth Modification)

Figure 8:
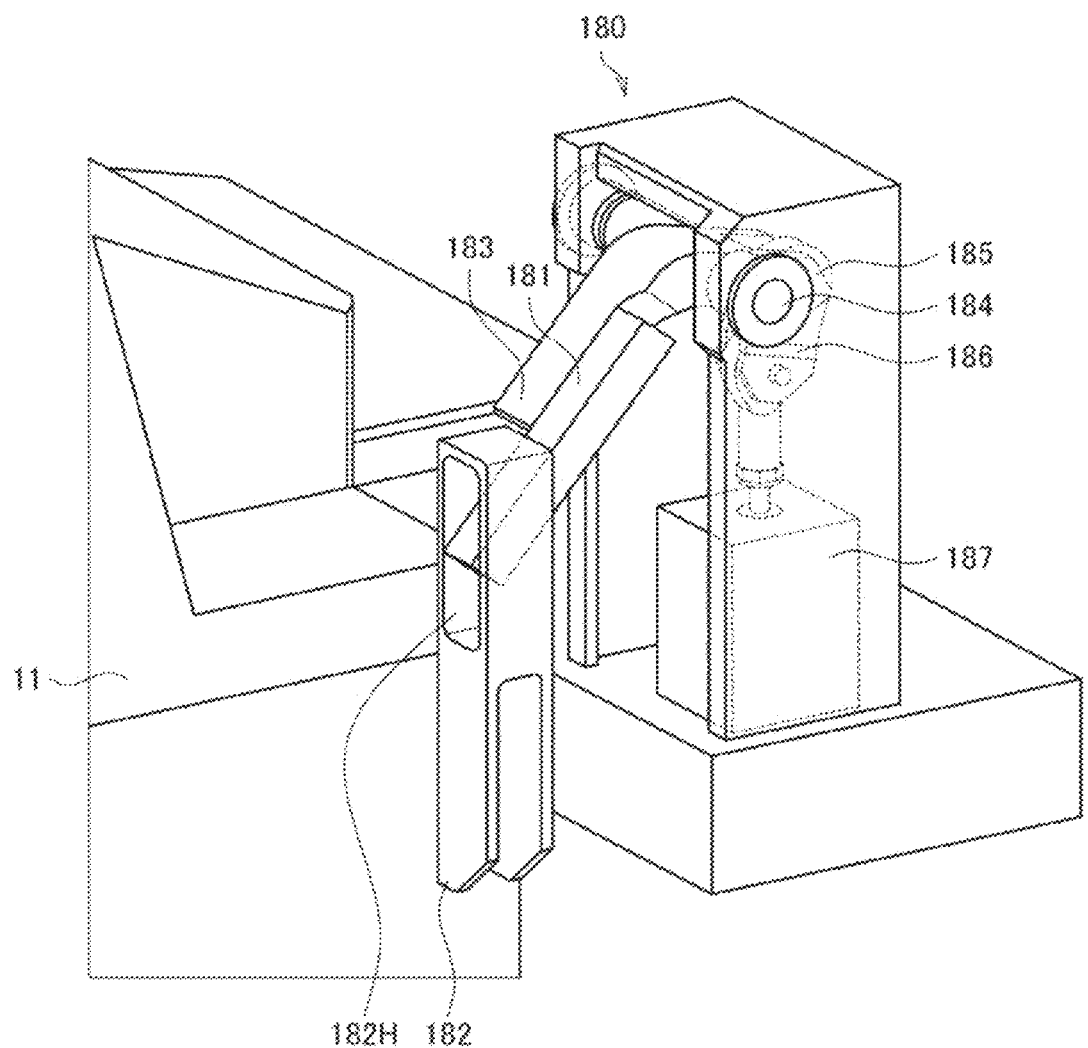
FIG. 8 is a perspective view illustrating a vicinity of coupling between a leg and a main body according to a fourth modification.
Figure 9:
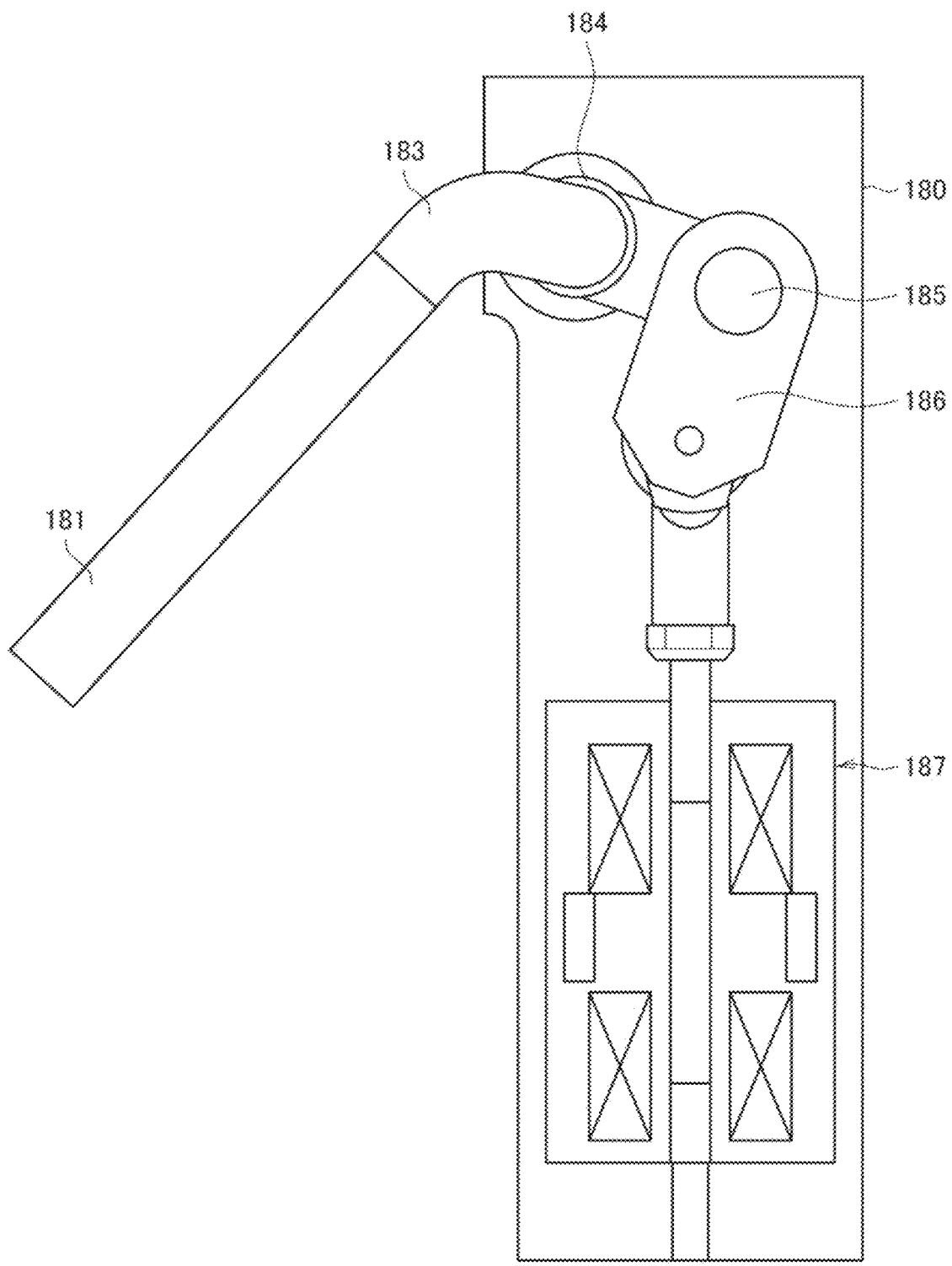
FIG. 9 is a cross-sectional view of the lock mechanism illustrated in FIG. 8 in a fixed state.
Figure 10:
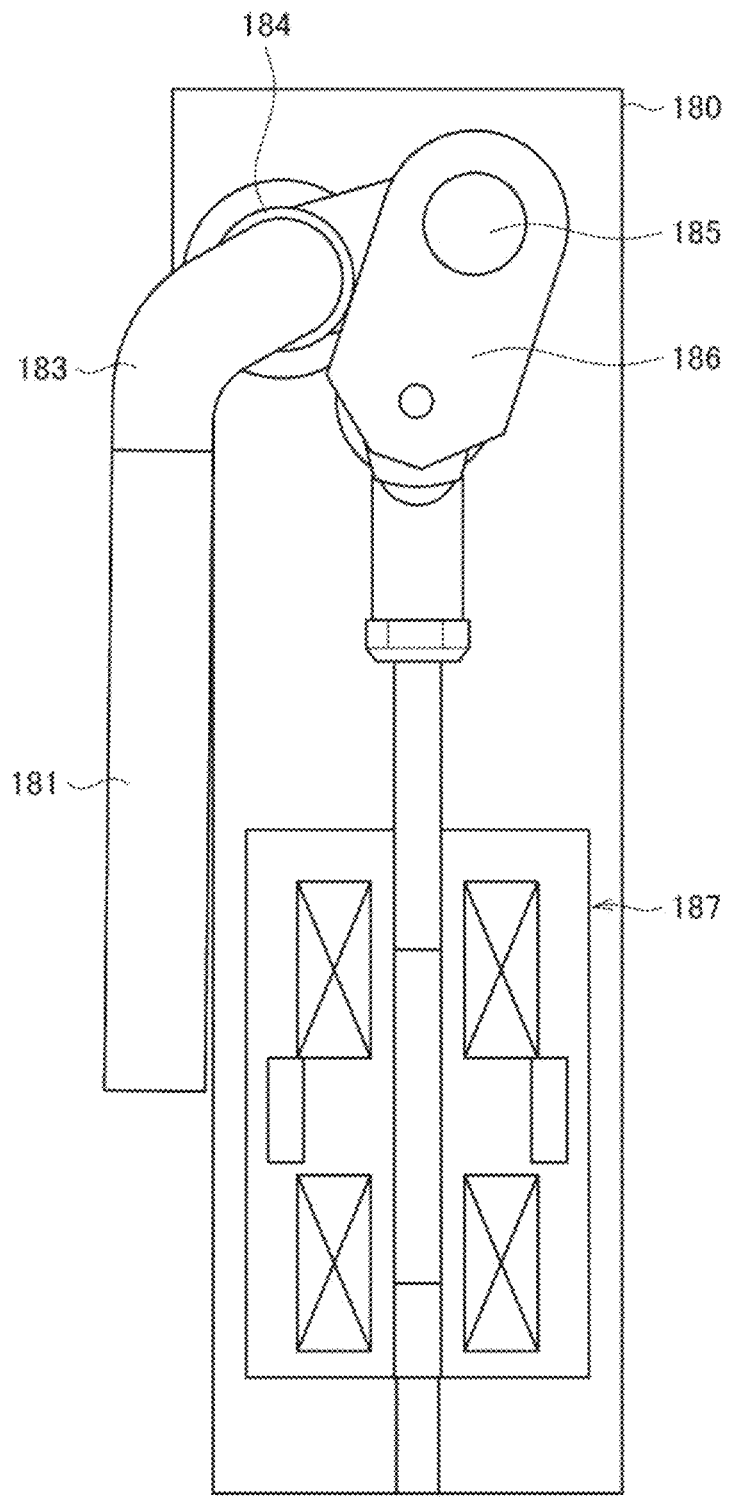
FIG. 10 is a cross-sectional view of the lock mechanism illustrated in FIG. 8 in a free state.

FIG. 8 is a perspective view illustrating the vicinity of coupling between the leg 11 and the main body 12 according to a fourth modification. FIG. 9 is a cross-sectional view of a lock mechanism 180 illustrated in FIG. 8 in a fixed state, and FIG. 10 is a cross-sectional view of the lock mechanism 180 illustrated in FIG. 8 in a free state.

As illustrated in FIG. 8, the leg 11 according to the fourth modification further includes the lock mechanism 180 between the leg and the main body 12. As illustrated in FIGS. 8 to 10, the lock mechanism 180 includes a key hole portion 182 including a key hole 182H, a key portion 181, links 183, and 186, a rotation shaft 184, a joint 185, and a solenoid 187.

Specifically, the key hole portion 182 is provided on the leg 11, and the key hole portion 182 has the key hole 182H in a face perpendicular to the rotation shaft of the leg 11. The key portion 181 is provided on the main body 12 side, and the key portion 181 has a rod-like structure capable of intersecting a face, of the leg 11, perpendicular to the rotation shaft. With this configuration, the key portion 181 can fix the rotation angle of the leg 11 by inserting the rod-like structure into the key hole 182H of the key hole portion 182 and preventing the rotation of the joint portion 140 coupling the leg 11 and the main body 12.

Further, the key portion 181 is connected to the solenoid 187 via the link 183, the joint 185, and the link 186. The link 183 is provided so as to be rotatable about the rotation shaft 184. The solenoid 187 is a self-holding solenoid, and can draw the plunger by the electromagnetic force of the solenoid 187 and apply a holding force to the drawn plunger.

For example, as illustrated in FIG. 9, the lock mechanism 180 in the fixed state can rotate the link 183 about the rotation shaft 184 by pulling the plunger into the solenoid 187. As a result, the key portion 181 protrudes so as to intersect a face, of the leg 11, perpendicular to the rotation shaft and is inserted into the key hole 182H of the key hole portion 182, so that it is possible to prevent the rotation of the joint portion 140 that couples the leg 11 and the main body 12. In addition, since the posture of the key portion 181 is fixed by transmitting the fixing force generated by the solenoid 187 via the links 183, and 186, it is possible to maintain the state of being inserted into the key hole 182H.

In addition, in the lock mechanism 180 in the free state, as illustrated in FIG. 10, the plunger is not pulled into the solenoid 187. Therefore, the key portion 181 does not protrude so as to intersect a face perpendicular to the rotation shaft of the leg 11, and is not inserted into the key hole 182H of the key hole portion 182. Therefore, since the key portion 181 does not prevent the rotation of the joint portion 140 coupling the leg 11 and the main body 12, the lock mechanism 180 can make the leg 11 rotatable with respect to the main body 12.

Figure 11:
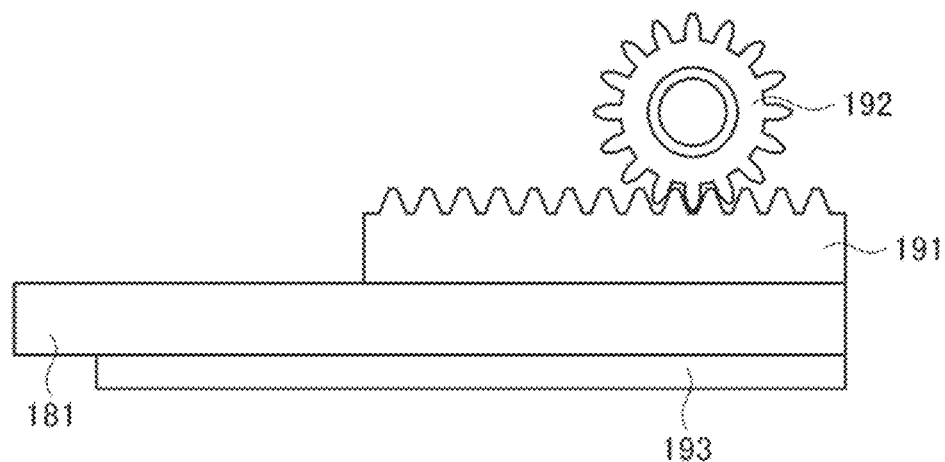
FIG. 11 is a schematic view illustrating an operation of inserting or pulling out a key portion using a rack-and-pinion mechanism.
Figure 12:
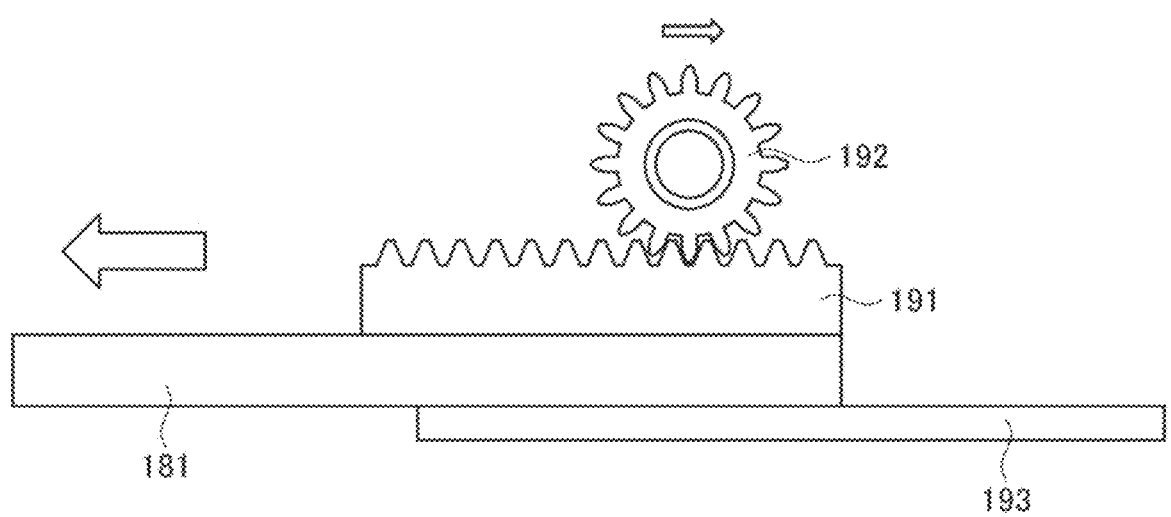
FIG. 12 is a schematic view illustrating an operation of inserting or pulling out a key portion using a rack-and-pinion mechanism.

Note that in the lock mechanism 180, even in a case where another configuration is used instead of the solenoid 187, the key portion 181 can be inserted into or pulled out of the key hole 182H. FIGS. 11 and 12 are schematic views illustrating insertion or pullout operation of the key portion 181 using the rack-and-pinion mechanism.

As illustrated in FIGS. 11 and 12, the key portion 181 may be inserted into or pulled out of the key hole 182H by a pinion gear 192 rotated by the motor and a rack gear 191.

Specifically, the pinion gear 192 is a circular spur gear having a small diameter, and the rack gear 191 is a member having a longitudinal shape in which teeth meshing with the pinion gear 192 are formed on one face. The key portion 181 is fixed to the rack gear 191 on a face opposite to the meshing face of the rack gear 191 and the pinion gear 192, and is slidably provided along the guide 193 on which the key portion 181 is placed.

As a result, the pinion gear 192 is rotated by the motor, so that the rack gear 191 meshing with the pinion gear 192 is moved in the direction parallel to the guide 193. Therefore, since the key portion 181 fixed to the rack gear 191 is similarly moved in the direction parallel to the guide 193, the key portion is inserted into or pulled out of the key hole 182H.

According to the above configuration, even in a case where a rack-and-pinion mechanism is used instead of the solenoid 187, the lock mechanism 180 can insert or pull the key portion 181 into or out of the key hole 182H. In such a case, the lock mechanism 180 can fix the rotation angle of the leg 11 with a simpler configuration.

Figure 13:
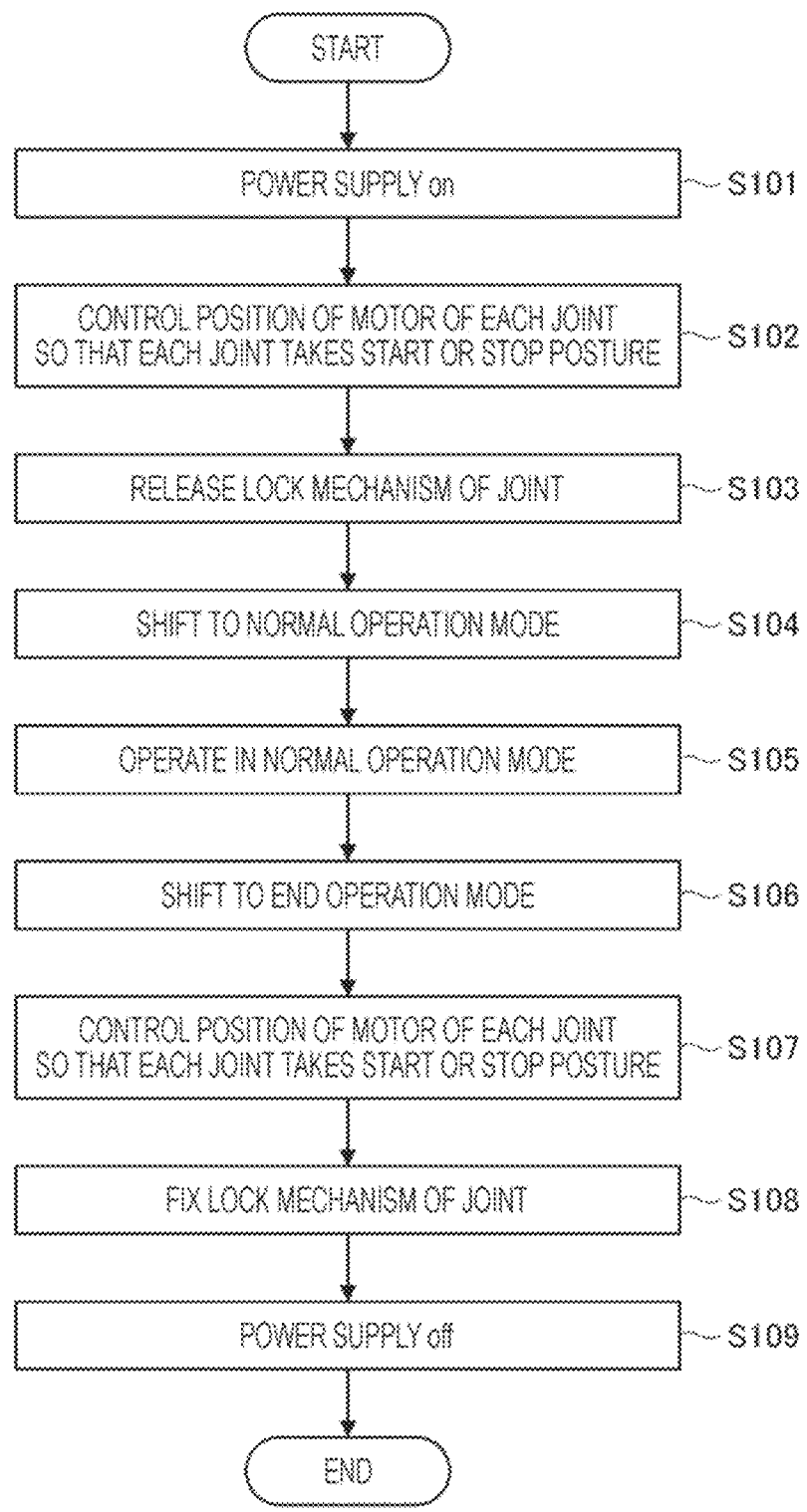
FIG. 13 is a flowchart illustrating a flow from start to stop of a mobile object including a leg according to the fourth modification.

Next, the operation of the lock mechanism 180 in the mobile object 1 including the leg 11 according to the fourth modification will be described with reference to FIG. 13. FIG. 13 is a flowchart illustrating a flow from start to stop of the mobile object 1 including the leg 11 according to the fourth modification.

As illustrated in FIG. 13, for example, first, power is applied to the mobile object 1 (S101). However, in the stopped state of the mobile object 1, it is assumed that the rotation angle of each leg 11 is fixed by the lock mechanism 180 described above. Subsequently, the mobile object 1 controls the position of the motor of each joint so that each joint takes the start or stop posture (S102). As a result, the lock mechanism 180 of each joint pulls out the key portion 181 from the key hole 182H, so that the lock mechanism 180 is released (S103), and each of the legs 11 is rotatable with respect to the main body 12 of the mobile object 1.

After the above operation, the mobile object 1 shifts to the normal operation mode (S104), and performs an operation such as legged walking in the normal operation mode (S105). Thereafter, in a case where the desired operation is ended, the mobile object 1 shifts to an end operation mode (S106).

In the end operation mode, the mobile object 1 controls the position of the motor of each joint so that each joint takes the start or stop posture (S107). As a result, the key portion 181 is inserted into the key hole 182H by the lock mechanism 180 of each joint, whereby the lock mechanism 180 is fixed (S108), and the rotation angle of each leg 11 is fixed with respect to the main body 12 of the mobile object 1. Thereafter, the power supply of the mobile object 1 is cut off (S109).

With the above operation, in the mobile object 1 including the leg 11 according to the fourth modification, the rotation angle of each leg 11 is fixed by the lock mechanism 180 at the time of non-energization, so that each leg 11 can be prevented from extending in a free direction. Therefore, since the mobile object 1 including the leg 11 according to the fourth modification can fix the angle of the leg 11 with respect to the main body 12 in the upright state at the time of non-energization, the mobile object 1 can have a compact shape more suitable for storage.

Specifically, in a case where the elastic unit 170 described in the second modification is included in the leg 11 of the mobile object 1, a repulsive force for extending the leg 11 from the elastic unit 170 is applied to the leg 11 at the time of contraction. In such a case, the mobile object 1 including the leg 11 according to the fourth modification can suppress the repulsive force from the elastic unit 170 by the own weight of the mobile object 1 and maintain the leg 11 in the contracted state by fixing the angle of the leg 11 with respect to the main body 12 in the upright state. With this arrangement, the mobile object 1 including the legs 11 according to the fourth modification can easily maintain a compact shape more suitable for storage.

3. APPENDIX

Figure 14:
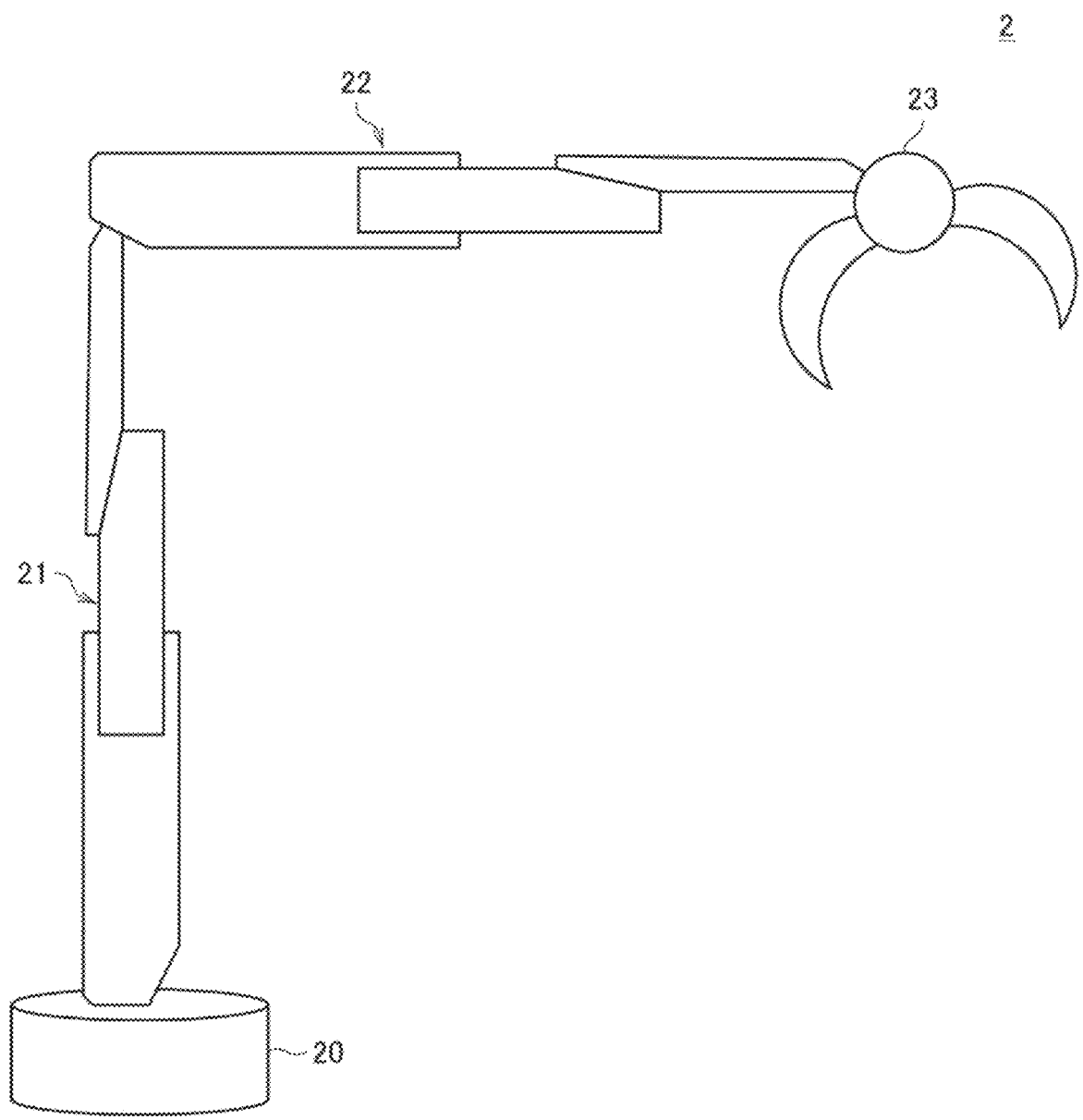
FIG. 14 is a schematic view showing a configuration of a robot arm device including a linear motion mechanism according to an embodiment of the present disclosure.

In the above embodiment, the example in which the linear motion mechanism 100 is included in the leg 11 of the mobile object 1 is described, but the technology according to the present disclosure is not limited to such an example. For example, the linear motion mechanism 100 may be included in a robot arm device 2. FIG. 14 is a schematic view illustrating a configuration of the robot arm device 2 including the linear motion mechanism 100 according to the present embodiment.

As illustrated in FIG. 14, the robot arm device 2 includes a pedestal 20, a first linear motion link 21, a second linear motion link 22, and an effector unit 23.

The pedestal 20 is a base that supports the robot arm device 2. The pedestal 20 may be fixed to, for example, a floor surface or a wall surface.

The first linear motion link 21 is a structural member including the linear motion mechanism 100 according to the present embodiment and is linearly movable in a direction perpendicular to the main surface of the pedestal 20. The first linear motion link 21 may be provided on the pedestal 20 so as to be rotatable about the normal line of the main surface of the pedestal 20.

The second linear motion link 22 is a structural member that includes the linear motion mechanism 100 according to the present embodiment and is linearly movable in a direction orthogonal to the linear motion direction of the first linear motion link 21. The second linear motion link 22 may be coupled to the first linear motion link 21 so as to be orthogonal to the linear motion direction of the first linear motion link 21.

The effector unit 23 includes a gripper that grips a target and the like, and is provided at the distal end of the second linear motion link 22. The robot arm device 2 can perform desired work on the target by the effector unit 23.

The robot arm device 2 can further reduce the size when the linear motion mechanism 100 contracts by applying the linear motion mechanism 100 according to the present embodiment to the first linear motion link 21 and the second linear motion link 22. Therefore, the robot arm device 2 can reduce the footprint and further reduce the possibility of interference between the first linear motion link 21 and the second linear motion link 22, and the outside world.

The preferred embodiments of the present disclosure have been described above in detail with reference to the accompanying drawings, but the technical scope of the present disclosure is not limited to such examples. It is obvious that those with ordinary skill in the technical field of the present disclosure may conceive various modifications or corrections within the scope of the technical idea recited in claims, and it is naturally understood that they also fall within the technical scope of the present disclosure.

Furthermore, the effects described in this specification are merely illustrative or exemplary, and are not limiting. That is, the technology according to the present disclosure may exhibit other effects obvious to those skilled in the art from the description of this specification together with or in place of the above-described effects.

Note that the following configurations also fall within the technical scope of the present disclosure.

(1)
A linear motion mechanism including an intermediate link including
 a conversion mechanism that converts a rotational force from a motor into a driving force in a linear direction, the intermediate link extending in the linear direction,
 a first link that linearly moves toward a first side in the linear direction from an end of the intermediate link on the first side on the basis of the driving force in the linear direction, and
 a second link that linearly moves toward a second side opposite to the first side from an end of the intermediate link on the second side on the basis of the driving force in the linear direction,
 in which the first link and the second link linearly move symmetrically in the linear direction in conjunction with each other.

(2)
The linear motion mechanism according to Item (1),
 in which the conversion mechanism includes a first ball screw and a second ball screw disposed in parallel to each other,
 the first link linearly moves on the basis of the driving force generated by the first ball screw, and
 the second link linearly moves on the basis of the driving force generated by the second ball screw.

(3)
The linear motion mechanism according to Item (2), in which the first ball screw and the second ball screw convert the same rotational force into the driving force toward the first side and the driving force toward the second side.

(4)
The linear motion mechanism according to Item (2) or (3), in which the rotational force is transmitted to the first ball screw and the second ball screw by a spur gear.

(5)
The linear motion mechanism according to Item (1),
 in which the conversion mechanism includes a pair of sprockets disposed in the linear direction and a chain bridged between the pair of sprockets, and
 the first link and the second link linearly move symmetrically to each other in the linear direction by a driving force from the chain.

(6)
The linear motion mechanism according to any one of Items (1) to (5), in which the first link and the second link linearly move along respective linear guides included in the intermediate link.

(7)
The linear motion mechanism according to any one of Items (1) to (6),
 in which the first link and the intermediate link are coupled on a first face, and
 the second link and the intermediate link are coupled on a second face parallel to the first face with the intermediate link interposed therebetween.

(8)
The linear motion mechanism according to any one of Items (1) to (7),
 in which the intermediate link internally includes the conversion mechanism, and
 an inside of the intermediate link is sealed by a seal unit.

(9)
The linear motion mechanism according to any one of Items (1) to (8), in which the linear motion mechanism is included in at least one or more legs of the mobile object.

(10)
The linear motion mechanism according to Item (9),
 in which the second link includes a joint connected to a main body of the mobile object, and
 the joint rotates the second link with a rotation shaft orthogonal to the linear direction.

(11)
The linear motion mechanism according to Item (10), further including a lock mechanism that fixes a rotation angle between the main body and the second link.

(12)

The linear motion mechanism according to any one of Items (9) to (11), in which a ground contact portion including a wheel is provided at an end of the first link on the first side.

(13)

The linear motion mechanism according to any one of Items (9) to (12), in which the leg extends and contracts by linear motion of the first link and the second link.

(14)

The linear motion mechanism according to Item (13),
in which the first link has a box-shaped structure in which a partial face is opened, and
the intermediate link is housed inside the box-shaped structure of the first link when the leg contracts.

(15)

The linear motion mechanism according to Item (14), in which the first link has the box-shaped structure in which at least one face in a retreating direction opposite to an advancing direction of the mobile object is opened.

(16)

The linear motion mechanism according to any one of Items (13) to (15), in which the intermediate link and the first link are housed inside the second link when the leg contracts.

(17)

The linear motion mechanism according to Item (16), further including an elastic unit that is elastically deformed between the intermediate link and the second link when the leg contracts.

(18)

The linear motion mechanism according to any one of Items (9) to (17), further including a cable carrier that supports wiring that electrically connects the intermediate link and the first link or the second link.

REFERENCE SIGNS LIST

1 Mobile object
11 Leg
12 Main body
100 Linear motion mechanism
110 First link
120 Second link
130 Intermediate link
140 Joint portion
150 Ground contact portion
151 Wheel
161 First cable carrier
162 Second cable carrier
170 Elastic unit
310 First conversion mechanism
311 First threaded shaft
312 First linear motion portion
313 First bearing
314 First linear guide
315 First coupling unit
320 Second conversion mechanism
321 Second threaded shaft
322 Second linear motion portion
323 Second bearing
324 Second linear guide
325 Second coupling unit
330 Power unit
331 First gear
332 Second gear
333 Motor gear
334 Motor
D1 First side
D2 Second side

The invention claimed is:

1. A linear motion mechanism comprising:
an intermediate link including a conversion mechanism that converts a rotational force from a motor into a driving force in a linear direction, the intermediate link extending in the linear direction;
a first link that linearly moves toward a first side in the linear direction from an end of the intermediate link on the first side on a basis of the driving force in the linear direction; and
a second link that linearly moves toward a second side opposite to the first side from an end of the intermediate link on the second side on a basis of the driving force in the linear direction,
wherein the first link and the second link linearly move symmetrically in the linear direction in conjunction with each other,
the conversion mechanism includes a pair of sprockets disposed in the linear direction and a chain bridged between the pair of sprockets, and
the first link and the second link linearly move symmetrically to each other in the linear direction by a driving force from the chain.

2. The linear motion mechanism according to claim 1, wherein the first link and the second link linearly move along respective linear guides included in the intermediate link.

3. The linear motion mechanism according to claim 1,
wherein the first link and the intermediate link are coupled on a first face, and
the second link and the intermediate link are coupled on a second face parallel to the first face with the intermediate link interposed therebetween.

4. The linear motion mechanism according to claim 1,
wherein the intermediate link internally includes the conversion mechanism, and
an inside of the intermediate link is sealed by a seal unit.

5. The linear motion mechanism according to claim 1, wherein the linear motion mechanism is included in at least one or more legs of a mobile object.

6. The linear motion mechanism according to claim 5,
wherein the second link includes a joint connected to a main body of the mobile object, and
the joint is configured to rotate the second link with a rotation shaft orthogonal to the linear direction.

7. The linear motion mechanism according to claim 6, further comprising a lock mechanism that fixes a rotation angle between the main body and the second link.

8. The linear motion mechanism according to claim 5, wherein a ground contact portion including a wheel is provided at an end of the first link on the first side.

9. The linear motion mechanism according to claim 5, wherein the leg extends and contracts by linear motion of the first link and the second link.

10. The linear motion mechanism according to claim 9,
wherein the first link has a housing in which a partial face is opened, and
the intermediate link is housed inside the housing of the first link when the leg contracts.

11. The linear motion mechanism according to claim 10, wherein the first link has the housing in which at least one face in a retreating direction opposite to an advancing direction of the mobile object is opened.

12. The linear motion mechanism according to claim 9, wherein the intermediate link and the first link are housed inside the second link when the leg contracts.

13. The linear motion mechanism according to claim 12, further comprising an elastic unit that is elastically deformed between the intermediate link and the second link when the leg contracts.

14. The linear motion mechanism according to claim 5, further comprising a cable carrier that supports wiring that electrically connects the intermediate link and the first link or the second link.

* * * * *